H. WISE.
CORN HARVESTING MACHINE.
APPLICATION FILED NOV. 6, 1909.
993,010.
Patented May 23, 1911.
5 SHEETS—SHEET 1.
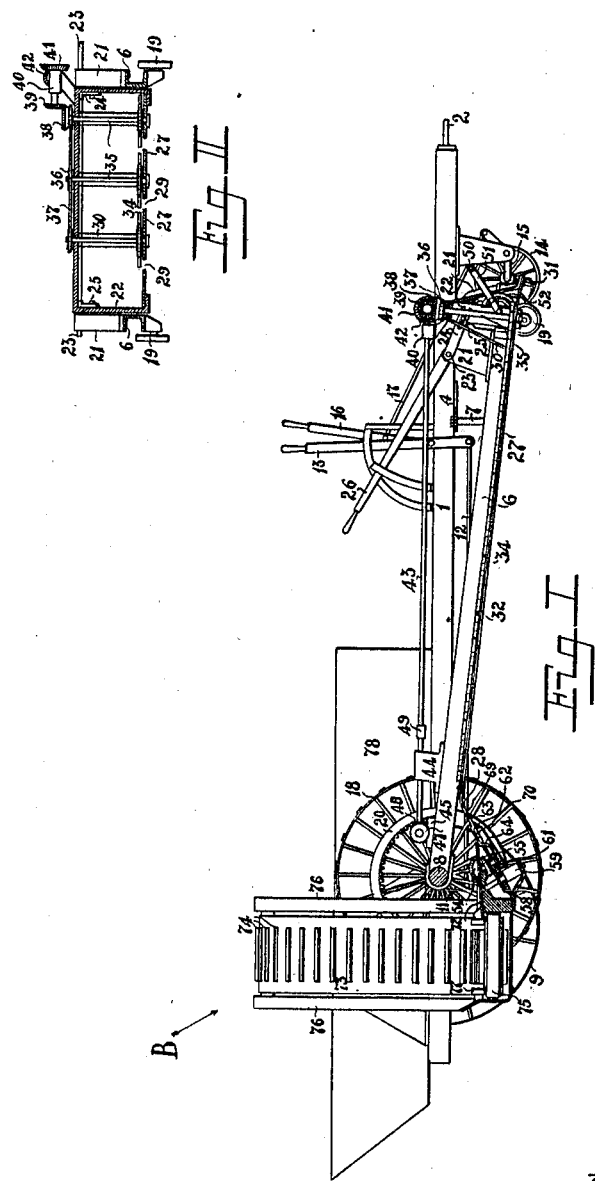
Witnesses
E. Schallinger
M. Schmid
Inventor
Henry Wise
By B. Singer
Att'y

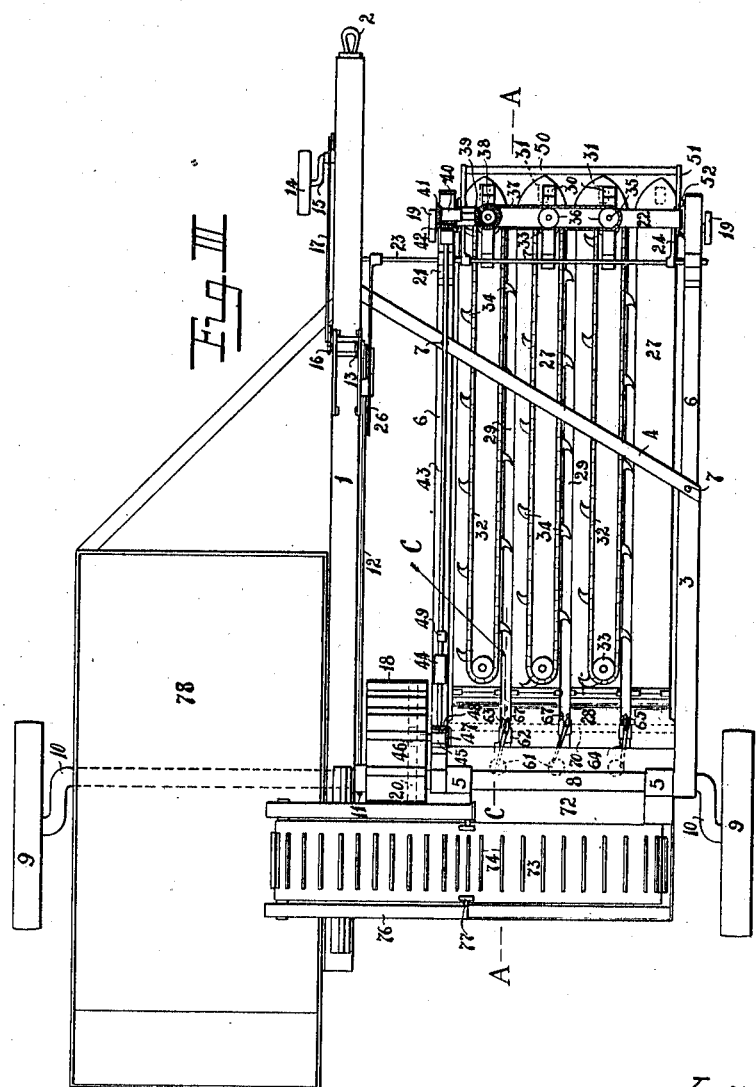

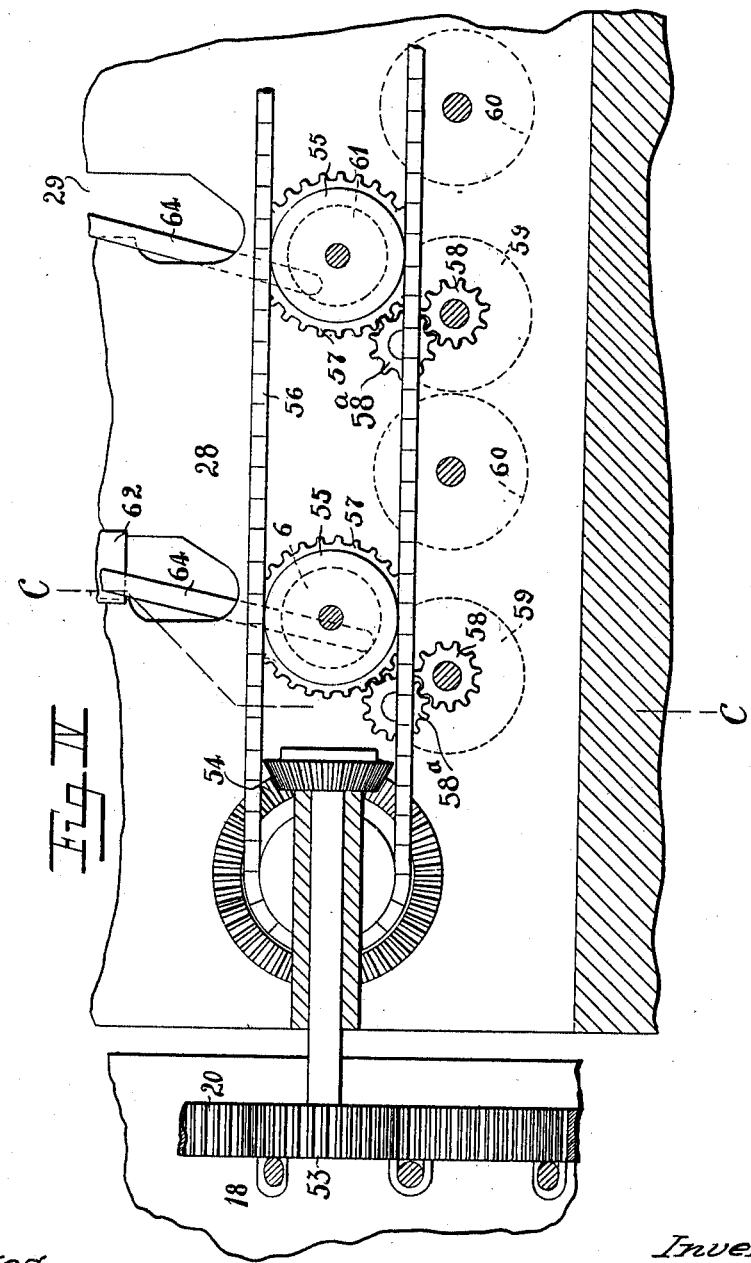

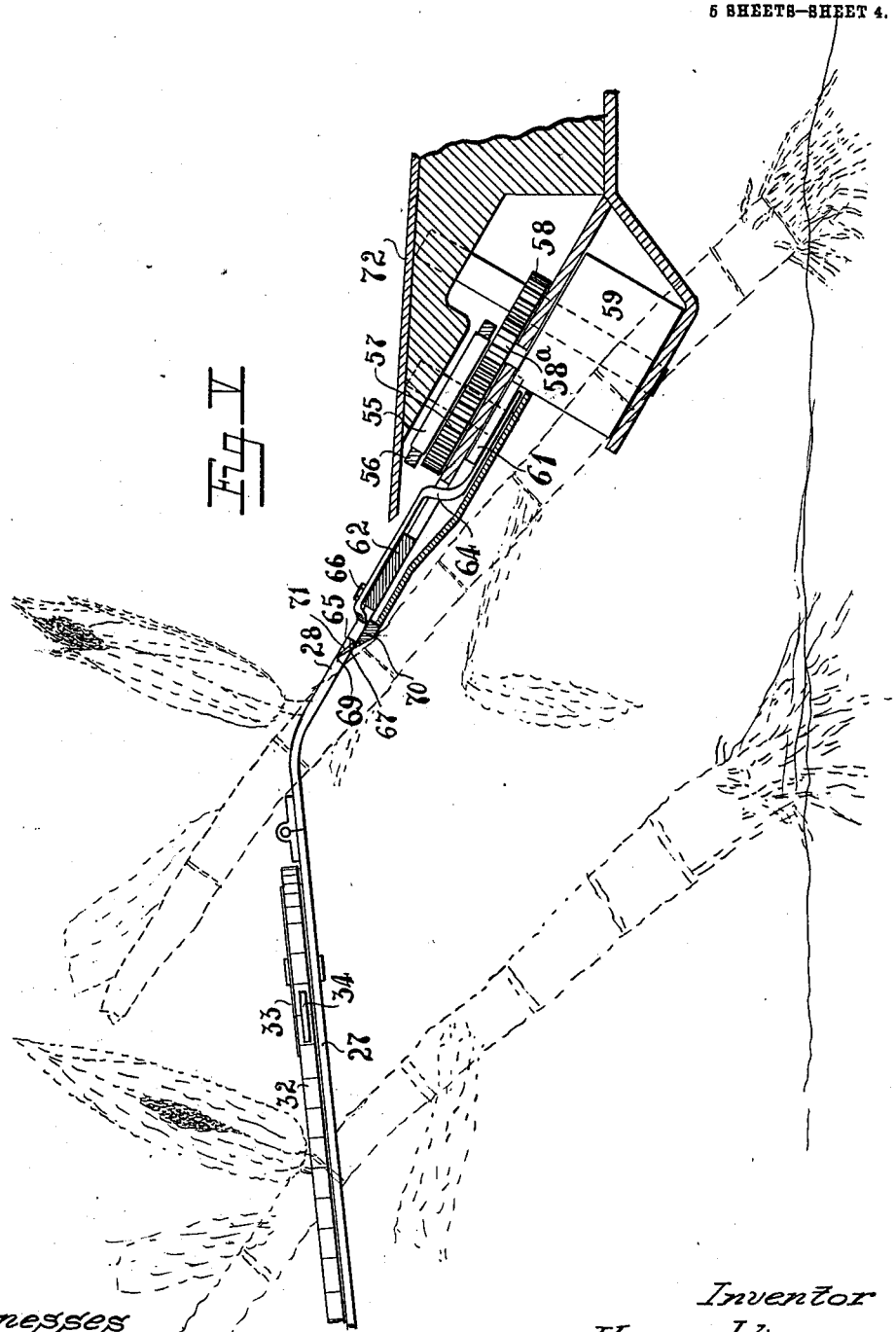

H. WISE.
CORN HARVESTING MACHINE.
APPLICATION FILED NOV. 6, 1909.
993,010.
Patented May 23, 1911.
5 SHEETS—SHEET 5.
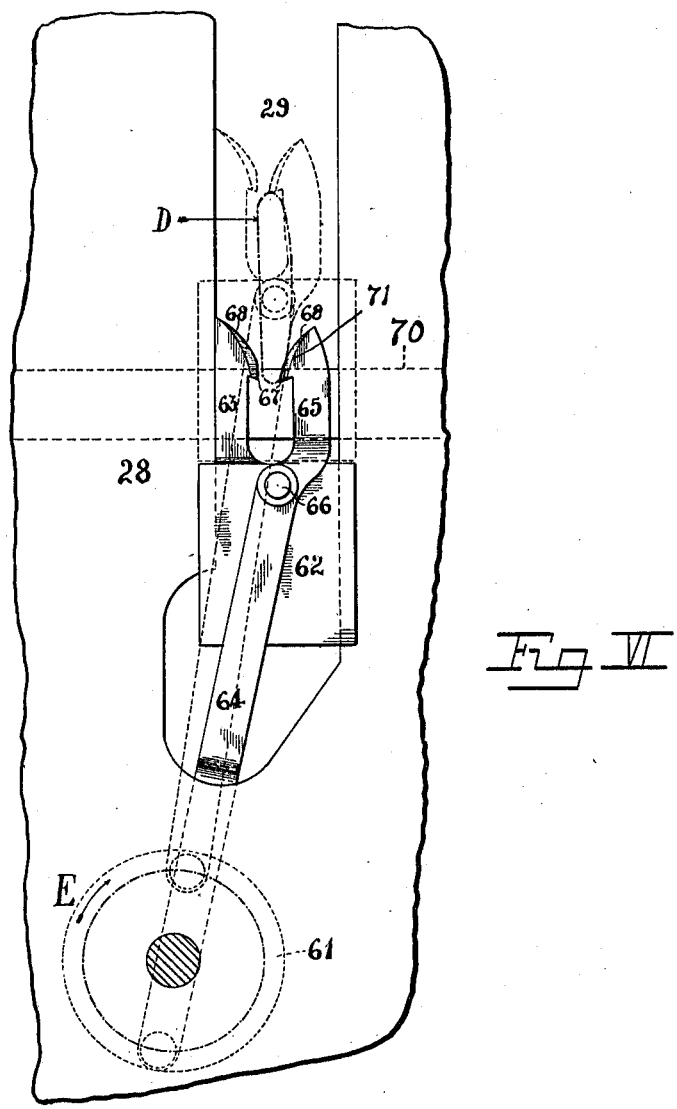

UNITED STATES PATENT OFFICE.

HENRY WISE, OF FRANKFORT, ORANGE RIVER COLONY, ASSIGNOR OF ONE-HALF TO OLIVER DIXON, OF FRANKFORT, ORANGE RIVER COLONY, SOUTH AFRICA.

CORN-HARVESTING MACHINE.

993,010.  Specification of Letters Patent.  Patented May 23, 1911.

Application filed November 6, 1909. Serial No. 526,566.

*To all whom it may concern:*

Be it known that I, HENRY WISE, carpenter, a subject of the King of Great Britain, residing at Frankfort, Orange River Colony, South Africa, have invented new and useful Improvements in Corn-Harvesting Machines, of which the following is a specification.

The present invention consists in a wheeled machine adapted upon being driven through a standing crop of ripe corn, to cut off and collect the ears, leaving the stalks upon the land.

The invention is illustrated in the accompanying drawings, in which—

Figure I is a side elevation partly sectioned upon the plane A—A Fig. III, Fig. II is a front view with details omitted, Fig. III is a plan, Fig. IV is an enlarged partial plan taken from the direction of the arrow B, Fig. I, Fig. V is a section on the plane C—C Figs. III and IV, viewed from the left of the latter figure; and Fig. VI is a further enlarged detached view of the ear severing device hereafter described.

The framework of the machine consists of the draw bar 1 carrying the draft attachment 2: the beam 3 braced to the draw bar 1 by the brace 4: the conveyer supports 5, 5: and the beams 6 secured to the brace 4 by bolts 7; said parts 1, 3, 5 and 6 being mounted rotatably upon the axle 8. The axle carries the traveling wheels 9 upon its cranked ends 10.

11 represents a lever rigidly secured to the axle 8 and coupled by means of rod 12 to the hand-lever 13 mounted upon the draw bar 1. Near to the forward end of the draw bar a smaller traveling wheel 14 is carried on a cranked axle 15 and controlled by the hand-lever 16 connected to it by the rod 17. Thus, by manipulating the levers 13 and 16, either end or both ends of the machine may be lifted upon the wheels 9 and 14 for turning or traveling purposes, or the machine may be lowered into its working position.

When in the working position, the driving wheel 18 and the casters 19 come into contact with the ground. The former is loosely mounted upon the axle 8 and carries the internally toothed gear wheel 20 for driving the various mechanisms hereafter referred to. The casters 19 are mounted upon and, during work, support the forward ends of beams 6. On top of said beams 6 are fixed the brackets 21, between which a frame 22 is mounted to slide in a substantially vertical direction. Said brackets also carry a rotatably mounted spindle 23 carrying slotted levers 24 which engage with pins 25 on the frame 22. By means of a hand-lever 26 the spindle 23 may be rotated to lift or lower the frame 22. Secured to said frame 22 are the forward ends of the gathering-in blades 27, the rear ends of which are hinged to a plate 28 fixed to the framework of the machine. Said rearward ends are for convenience of construction elevated somewhat above the front ends. Said blades 27 are separated to form between them the gathering-in slots 29, the width of which is such as to permit the stalks to pass freely through them but not the ears,—that is about 2″. There may be one or more such slots 29, as desired; three are shown and consequently four blades 27. The outside blades are shown attached directly to the frame 22; the inner ones being connected thereto by hangers 30. Below the point of each blade is formed a curved resilient toe 31, the function of which is to obviate such point digging into rough ground. Upon the upper surface of three of the blades are mounted the gathering-in chains 32 passing at each end over sprockets 33 and carrying hooks 34 which travel along the slots 29. The forward sprockets 33 are secured to and driven by spindles 35 mounted upon the frame 22 and carrying at their upper ends sprockets 36 which are all connected by a chain 37. To the end sprocket 36 is secured the bevel wheel 38 driven by the bevel wheel 39 mounted in the bracket 40 secured to frame 22 and carrying also the bevel wheel 41. The latter again gears with wheel 42 secured to spindle 43, the forward end of which is also carried in bracket 40 and the rear end in the brackets 44 and 45 secured to the beam 6. Said spindle 43 is driven from the gear wheel 20 of the driving wheel 18 by means of the pinion 46, the bevel wheel 47 rigidly secured therewith, and the bevel wheel 48 upon said spindle 43.

49 is a universal joint intercalated in spindle 43.

It will thus be seen that as the machine travels forward, the hooks 34 travel along the slots 29 backwardly relatively to the blades 27; their rate of motion however, being so adjusted that when so moving they are stationary relatively to the ground, so that they hold stationary the stalks presented to them. At the same time the universal joint 49 permits the frame 22 and blades 27 to be adjusted in height as may be required under different working conditions, without impairing the movement of said hooks 34.

A stalk-bending bar 50 is carried upon arms 51 pivoted to the frame 22, so that it may be raised or lowered as required to bend the stalks more or less, or to close the entrance to the slots entirely when it is not desired to gather in the plants. The bar 50 is fixed in the required position by clamping the arms 51 to the slotted quadrants 52 by means of bolts.

As already mentioned, the blades 27 slope gently upward to their junction with plate 28. Said plate 28 on the other hand inclines downward toward the rear and with a sharper inclination; namely that approximately to which the stalks are bent. Furthermore, the slots 29 are continued for a certain distance into the plate 28.

The mechanism so far described operates thus:—Upon the machine being driven through the crop, the plants are bent forward by means of the bending bar 50, and are then gathered into slots 29. In passing up said slots they are retained in the bent position both by the bar 50 continuing to pass over them and by the back of the hooks 34, by which they are engaged after being bent. In this position they pass up the slots 29 to the plate 28. In so passing up, the lowermost ear of each stalk is engaged by the blades 27 and by them, owing to the drag of the inclined stalk, is brought to or retained at the upper side of the latter. As the lower ears are severed as hereafter described, the succeeding ears are similarly turned or retained upward. The plants are thus presented to the plate 28 lying substantially parallel therewith, but passing at a slight angle through the slots 29 thereof and with the ear uppermost, as shown in dotted lines in Fig. V. Severance of the ears is next accomplished by the mechanism now to be described.

Driven by the gear wheel 20 is a pinion 53 which by means of the bevel gearing 54 drives the end one of a series of sprocket wheels 55 all joined by a chain 56. Upon the spindles of said chain wheels 55 are gear wheels 57 driving gear wheels 58 through intermediate wheels 58ᵃ. The gear wheels 58 are secured to the spindles of rollers 59 each of which coöperates with an idler roller 60 to take hold of the stalks immediately before they are released by the hooks 34. Similarly to the hooks, said rollers move at such a rate as to hold the stalks motionless; and it may here be remarked that the function of said hooks and rollers is primarily to hold plants which are partially or wholly broken off from their roots. Also to the spindles of said chain wheels 55 are secured the crank disks 61. In each slot 29 of the plate 28, a slide 62 is mounted to reciprocate longitudinally, and is furnished at its forward edge with a jaw 63. A connecting rod 64 connects each crank 61 to its slider 62; the free end of said rod beyond the slider being formed as a jaw 65 complemental to jaw 63. Crank disk 61 is eccentric to the line of motion of the pin 66, and the dimensions of the parts of the connecting rod on each side of pin 66 are so adjusted that upon the crank being revolved in the direction of the arrow E, Fig. VI, the back point 67 of jaw 65 will trace out the elliptical path D shown in dotted lines, or in other words the jaws 63, 65, will move backward and downward when closed, and will be open when moved forward and upward. The gap of the jaws is made just sufficient readily to pass the neck of an ear, but of less size than the diameter of the stalk below the topmost ear,—say ½ inch. Also the jaws are curved outwardly at their edge 68 and beveled off underneath as shown at 69. The result is that as they travel forward and meet the plant, they pass around the neck of the ear, but thrust down and fail to gather in the stalk. Upon the return stroke, they first close together around the neck of the ear and then force the ear downward relatively to the stalk, so breaking it off. In order to insure every ear being severed, a knife 70 is secured transversely and below the slots 29 with its edge advanced a short way beyond the rearward termination of the travel of the points 67 of the jaw; the latter working over the knife shearwise. Thus, should the ear fail to be dragged off by the pull of the jaws, its neck will be sheared between the jaws and the knife 70. The rate of reciprocation of the jaws is usually such that should they just miss gathering in an ear upon commencing one return stroke, they will have effected a second return stroke before the knife 70 has quite reached such ear, by reason of the continuous forward motion of the machine. In other words, their mean linear speed should be about three times that of the machine over the ground; by this means the possibility of the ear dragging against the knife is avoided. The curved edges 68 of the jaws are formed with a cutting edge 71 so that should they chance to close upon the neck of an ear, they will sever the same without damage to the mechanism. The severed ears fall upon the inclined plate 72 which shields the mechanism beneath it and are delivered to a conveyer. Said conveyer consists of a belt 73 faced with cross slats 74. It is mounted by means of rollers 75, upon the supports 5 and the standards 76; the horizontal and inclined parts of the belt being retained in position by means of guide rolls 77 pressing upon its face. It is driven from the gear wheel 20 by suitable mechanism—not fully shown—so as to collect the ears upon its horizontal part, raise them and discharge them into the box 78.

What I claim, and desire to secure by Letters Patent is:—

1. In a corn harvester, the combination of a guide structure having a slot disposed parallel to the line of travel of the harvester, said structure being inclined to force the ears of the stalks above the same, a jaw device traversing said slot, and means causing said device first to engage the neck of the ear and to discard the stalk and then force the ear downward relatively to the stalk.

2. In a corn harvester, means for bending the plant, a device arranged for operation substantially parallel with the direction of the stalk so bent, and means actuating said device to engage the ear neck selectively and to force the same downward relatively to the stalk.

3. In a corn harvester, a pair of reciprocating jaws, means for actuating said jaws to engage the neck of an ear and force the same downward relatively to the stalk of the plant, and a knife arranged transversely to the direction of movement of said jaws and forming a shearing abutment for the same.

4. In a corn harvester, means for bending the plants, guiding means forming slots adapted to gather in the bent plants, said guiding means being in part inclined downward rearwardly at approximately the angle of the plants, the slots being reduced in width to carry the ears on top throughout their whole length, and ear severing means associated with the rearwardly inclined part of the guiding means and including jaws opening to an extent to admit the neck of the ear and exclude the adjacent part of the stalk.

5. In a corn harvester, a reciprocating jaw structure including jaws, means causing the jaws to open on the forward movement and to close on the rearward movement, and plant guiding means for bringing the ear necks within the range of said jaws, said first named means being constructed and arranged to open said jaws to a limited extent to cause them to engage the ear necks selectively.

6. In a corn harvester, an ear stripping device comprising a member provided with a pin and guided to slide longitudinally and formed with a jaw, a rotatable crank, a connecting rod coupling the crank to said pin, said crank being pivoted laterally of the line of movement of said pin, said connecting rod being continued past the pin to form a complemental jaw to the first named jaw.

7. In a corn harvester, the combination with stalk guiding means, of an ear stripping device coacting with said means and comprising a longitudinally reciprocable jaw, a second jaw coacting with said first named jaw and provided with an extension, and a crank located at one side of the path of said jaws and connected with said extension for moving said jaws in an opening position in one direction and in a closed position in another direction.

8. In a corn harvester, the combination with stalk guiding means, of an ear stripping device coacting with said means and comprising a pair of jaws provided with cutting edges for severing the neck of the ear engaged thereby, and means for reciprocating and opening said jaws during movement thereof in one direction and closing said jaws about the ear neck during movement of said jaws in an opposite direction.

9. In a corn harvester, the combination with stalk guiding means, of an ear stripping device coacting with said means and comprising a pair of jaws having inclined faces to force the stalk away from the ears, means for presenting the plant to said jaws with the ears uppermost, and means for advancing and opening the jaws sufficiently to admit the ear neck and not the stalk and subsequently returning and closing said jaws about said neck.

10. A wheeled corn harvester adapted to be driven over the land, including moving stalk holding means driven by forward movement of the harvester whereby the surface of said holding means in contact with the stalk is motionless in the direction of the harvester's movement and the stalk is held stationary, in combination with means for engaging the necks of the ears and forcing them downward relatively to the stalks.

11. In a corn harvester, a plurality of blades forming between them stalk passage-ways, and in front thereof a stalk bending bar adjustable in height and adapted to close the mouths of said passage-ways.

12. In a corn harvester, a main framework, a plurality of hinged blades forming between them gathering-in slots for the stalks, means for bending the stalks, ear stripping means at the rear ends of the slots, a frame carrying the forward ends of the blades, means for adjusting such frame relatively to the main frame-work, stalk gathering chains mounted upon the blades to traverse the slots, gearing mounted upon said frame for driving said chains, a main driving wheel and mechanism connecting the aforesaid gearing to said driving wheel and embodying a flexible element.

13. In a corn harvester, the combination with a plurality of blades arranged to form stalk passageways therebetween, of an adjustable stalk bending device arranged to close the mouths of said passageways.

14. In a corn harvester, the combination with stalk guiding means, of an ear stripping device coacting with said means and including a longitudinally reciprocable jaw, a second jaw coacting with said first named jaw, and means connected with said second jaw for reciprocating said jaws in an open position in one direction and in a closed position in its opposite direction.

In testimony whereof I affix my signature in presence of two witnesses.

HENRY WISE.

Witnesses:
W. HILLMAN VINCENT,
WESLEY E. JOHN.

Copies of this patent may be obtained for five cents each, by addressing the "Commissioner of Patents, Washington, D. C."